US006965920B2

(12) United States Patent
Pedersen

(10) Patent No.: US 6,965,920 B2
(45) Date of Patent: Nov. 15, 2005

(54) PROFILE RESPONSIVE ELECTRONIC MESSAGE MANAGEMENT SYSTEM

(76) Inventor: Peter Henrik Pedersen, Gorkis Allé 16, Soeborg (DK) DK 2860

( * ) Notice: Subject to any disclaimer, the term of this patent is extended or adjusted under 35 U.S.C. 154(b) by 800 days.

(21) Appl. No.: 09/904,270

(22) Filed: Jul. 12, 2001

(65) Prior Publication Data

US 2002/0007400 A1    Jan. 17, 2002

Related U.S. Application Data

(60) Provisional application No. 60/217,719, filed on Jul. 12, 2000.

(51) Int. Cl.[7] .............................................. G06F 15/16
(52) U.S. Cl. .................................. 709/206; 707/104.1
(58) Field of Search .............................. 709/201, 206, 709/217; 713/184; 707/10, 104.1; 379/93.24

(56) References Cited

U.S. PATENT DOCUMENTS

| 5,765,033 | A |   | 6/1998 | Miloslavsky |
| 6,023,700 | A | * | 2/2000 | Owens et al. ................. 707/10 |
| 6,047,310 | A | * | 4/2000 | Kamakura et al. .......... 709/201 |
| 6,146,026 | A |   | 11/2000 | Ushiku |
| 6,182,118 | B1 |   | 1/2001 | Finney et al. |
| 6,249,807 | B1 |   | 6/2001 | Shaw et al. |
| 6,463,462 | B1 | * | 10/2002 | Smith et al. ................. 709/206 |
| 6,571,279 | B1 | * | 5/2003 | Herz et al. ................... 709/217 |
| 6,711,682 | B1 | * | 3/2004 | Capps ........................ 713/184 |
| 6,732,101 | B1 | * | 5/2004 | Cook .......................... 707/10 |
| 2002/0120692 | A1 | * | 8/2002 | Schiavone et al. .......... 709/206 |
| 2005/0002503 | A1 | * | 1/2005 | Owens et al. ............ 379/93.24 |

* cited by examiner

Primary Examiner—John Follansbee
Assistant Examiner—Jungwon Chang
(74) Attorney, Agent, or Firm—Sherman D. Pernia

(57) ABSTRACT

A system and method for the central specification and management of how messages are distributed to recipients with the steps of: a recipient profile system for entering and storing rules about how to distribute specific types of messages and content from specific messengers to individual recipients, a messenger profile system where messengers can enter, store and maintain his identification information and the types of message services he/she will offer to recipients, a message input system where messengers manually or automatically can enter messages or upload message files for distribution to recipients with a valid recipient profile, an individual message generator combining the data from recipient profile and the message from the message input system into a plurality of individual messages for recipients as specified by the messenger.

18 Claims, 8 Drawing Sheets

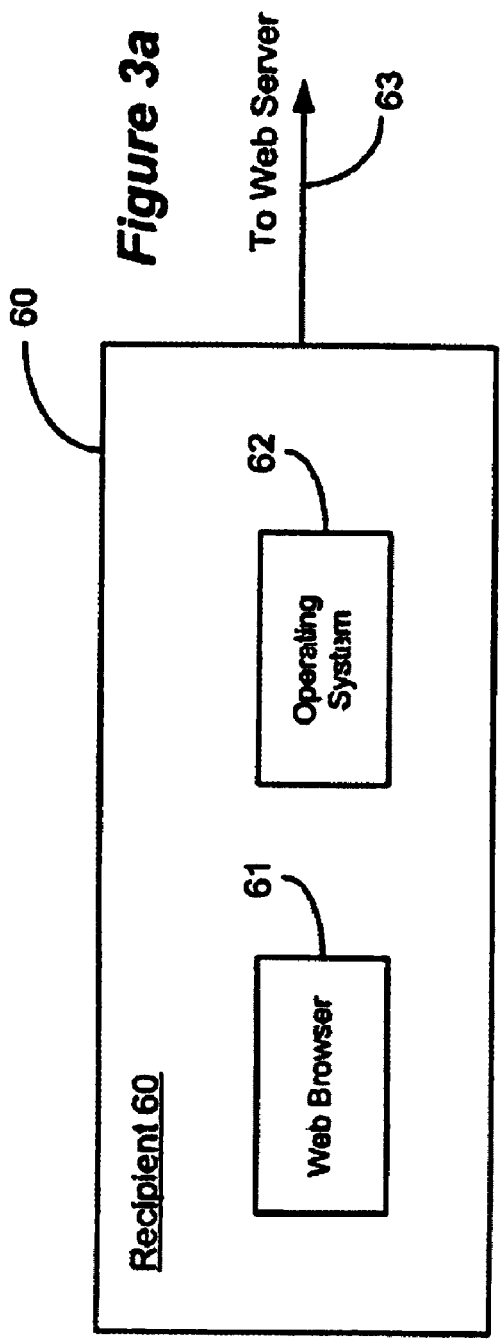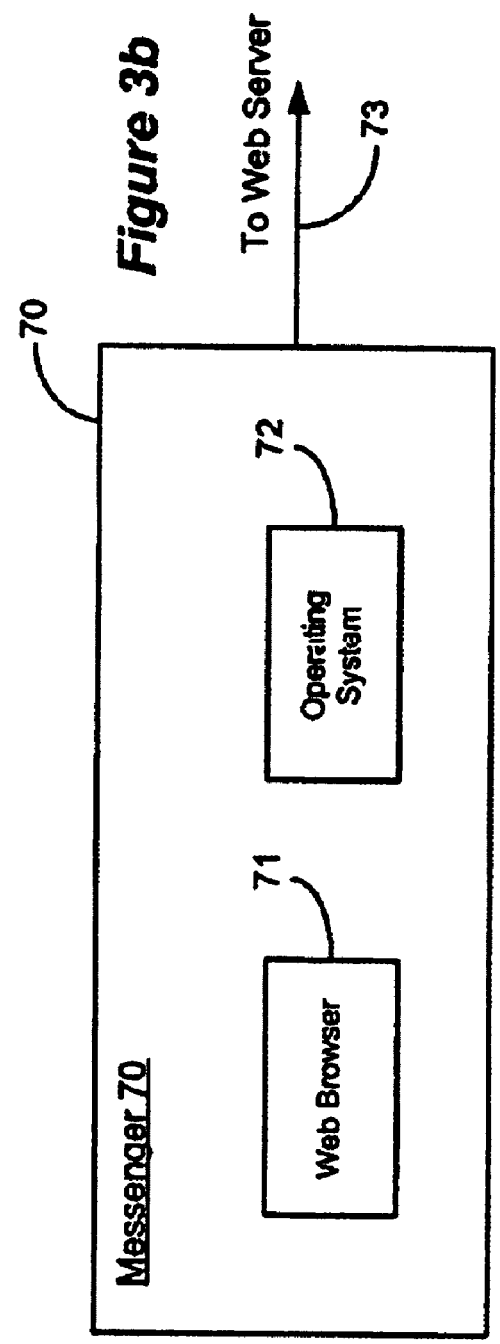

PROFILE RESPONSIVE ELECTRONIC MESSAGE MANAGEMENT SYSTEM

The present application claims the benefit of prior filed U.S. Provisional Patent Application Ser. No. 60/217,719, filed Jul. 12, 2000, to which the present application is a regular U.S. National Application.

FIELD OF THE INVENTION

The present invention is in the field of electronic computers and digital processing systems for filtered and targeted electronic message distribution. More specifically, the present invention relates to a system and method for the central filtering and distribution processing of messages from multiple messengers to selected individual recipients under filtering and distribution parameters in part established by each intended recipient.

BACKGROUND OF THE INVENTION

This invention relates generally to the field of messaging and more particularly to a process and method for central specification and management of how messages are distributed to recipients. The need for receiving messages in different media and through different devices is exploding. Physical (hardcopy) letters and faxes, and phone message means have been supplemented with e-email, SMS messages, WAP, voice messages, Extranet updates and more means to come.

Presently for organizations to keep customers and clients updated with the kind of information and messages that will assure goodwill and loyal behavior is a complex task requiring resources, focus and complex information technology (IT) solutions. Many organizations already have rule based Customer Relation Management IT systems. These systems are designed to handle message profiles based on rules for how each individual customer/client will receive information and messages.

Since customer information can be mission critical, Customer Relation Management (CRM) systems are most often for security reasons maintained by the customer service department inside the organization. Defining and changing message profile requires an interaction between each individual customer and the customer service department, to prevent unauthorized access to the CRM system by individuals. These message profiles must be entered and maintained in every single CRM system—in every single organization—for every single customer/client. The customers/clients will find it both time consuming and difficult to contact all his information suppliers to make them update his profile with e.g. a new e-mail address or phone number.

Due to the complexity, time consuming and resource demanding task in defining, operating and maintaining messages profiles on a one-to-one basis, only a few organizations today are able to keep customers/clients informed with respect to how, when and where the individual customer prefer to receive his message information. The inaccessibility of efficient message management means results in widespread use of inefficient mass communication means, such as spam e-mail, and household delivered promotion materials ("junk mail"). The massive use of Direct Mailings without relevance annoys the receiver by filling up his mailbox and ignoring his/her real interests. Additionally, the distribution to a potential customer of relevant information—but at the wrong time or in the wrong place may disappoint or frustrate a receiver who missed or was not able to use the information. These considerations may even dissuade companies from distributing any information at all, because it is too complex, costly and time consuming. This can leave customers motivated to exploit alternative companies, lowering customer loyalty, and lowering overall business effectiveness dramatically.

Particularly regarding electronic messaging, the field has recognized some of the existing disadvantages and has been motivated to address them. For example, Miloslavsky, U.S. Pat. No. 5,765,033, discloses a rule based electronic mail system for receiving messages, extracting information from the message, and then forwarding the extracted information to a particular recipient based on the content of a set of rules. However, the recipient of the information and the sender of the message do not have direct access to the rule set and the ability to redefine the sets parameters. Finney et al., U.S. Pat. No. 6,182,118, also disclose a rule based system for managing electronic messages. In the Finney system, a recipient can access the rule set and define in advance certain parameters controlling whether a message received by the system is forwarded to the recipient. However, the system of Finney does not provide for a sender of a message being able to define any parameters of the rules controlling the forwarding of its messages to a designated recipient or group of recipients.

Therefore, it would be beneficial to have an electronic message management system where each individual recipient could access a rule set and maintain the parameters of his/her own message profile, thus, enabling each recipient to designate specific or classes of messenger from whom they are willing to receive a message, and to specify how the information or messages are to be delivered. Additionally, it would be usefull for messengers to be able to submit not only message content, but also individual and group recipient profiles or identifications to the central message management system rule set, to enable message distribution and delivery to recipients according to individual recipient profiles. It would be further useful to have an electronic messaging system wherein individual recipients centrally can define a plurality of recipient profiles specifying how messages from messengers generally or from certain messengers specifically must be distributed to him/her.

SUMMARY OF THE INVENTION

The present invention is an electronic message management system and method for the central specification and management of how messages electronic messages received from a plurality of messengers or sources are distributed to individual recipients. The present message management system comprises an electronic computer system in operative communication with a global digital communications network, and a message management database in operative communication with the computer system. The computer system of the present message management system includes: a recipient profile application for receiving recipient profile data from recipients via the global network and storing the recipient data in the database; a messenger profile application for receiving messenger profile data from messengers via the global network and storing the messenger data in the database; a message input application for receiving message files from a messenger via the global network and storing the message files in the database; and an individual message generator in communication with the database and operative to access and utilize data and files from the database to generate an individual message to be sent via the global communications network to a recipient specified by a messenger. A recipient is an individual or related group of individuals to whom a message is directed or sent. A messenger or messengers are the initiators of messages sent to the recipients.

The computer system of the present message management system further comprises a message management server operating system, and the message management database further comprises recipient and messenger profile databases for storing recipient and messenger profile data respectively, and a message database for storing message data files. The recipient profile application includes a global network interactive recipient profile input form. The recipient profile input form is accessible to a recipient computer via a global communications network. The recipient profile application also includes a network interface and a recipient profile editor for receiving recipient profile data from a recipient computer via the global network interface, and for manipulating the recipient profile database to store the recipient profile data. The recipient profile application receives and stores a plurality of messenger specific profiles, each profile indicating delivery parameters for where, when and how specific types of messages from each messenger are to be delivered to the recipient.

The messenger profile application includes a global network interactive messenger profile input form, which is accessible to a messenger computer via the global communications network. The messenger profile application also includes a global network interface and a messenger profile editor for receiving messenger profile data from a messenger computer via the global network interface, and for manipulating the messenger profile database to store the messenger profile data. Messenger profile data can include: messenger identifying data, recipient identifications and recipient profiles, which messages to deliver to the recipients, and the profiles stored. The messenger profile application further includes receiving and storing recipient identification and recipient profiles for recipients who are to be prevented from receiving a message from the messenger.

The message input application includes an interactive global network message input form, the message input form being accessible to a messenger computer via the global communications network. The message input application further comprises a global network interface and a message data file editor for receiving a message file data from a messenger computer via the global network interface and for manipulating the message database to store the message data file.

The individual message generator of the message management system communicates with the databases to identify messages and messenger parameters that are compatible with a recipient profile and to generate individualized messages configured for delivery to the appropriate recipient. Once the individual message is generated, the message generator sends the individual message to the recipient via a means selected from the group consisting of: electronic mail, voice telephone, facsimile transmission, and digital transmission, or other means as specified by the recipient in the recipient's profile parameters.

In practice, the present the message management system is accessible from a client computer via a global communications network, to centrally manage the distribution and delivery format of messages from multiple messenger sources to multiple individual recipients. This is accomplished by providing client computers with access to the message management system via a global communications network, where the client computers are messenger and recipient computers. The message management system receives a connectivity request from a client computer for access to the message management system to input data. The message management system connects to the client computer via the global communication network, and prompts the client computer for the data to be inputted by providing a data input form to the client computer. The message management system accepts input data from the client computer via the input form, and enters the input data into a message management database of the message management system. Input forms practicable in the present message management system include: a recipient profile form, a messenger profile form, and a message input form. Other input forms or display forms may also be displayed by the message management system on a client computer system.

Accepting input data includes entering the input data into an electronic message management database, such as a recipient profile database, a messenger profile database, or a message database.

BRIEF DESCRIPTION OF THE DRAWINGS

FIG. 3a is a block diagram of one embodiment of a message management user computer system.

FIG. 3b is a block diagram of one embodiment of a message management messenger computer system.

DETAILED DESCRIPTION OF THE INVENTION

Figure 1:
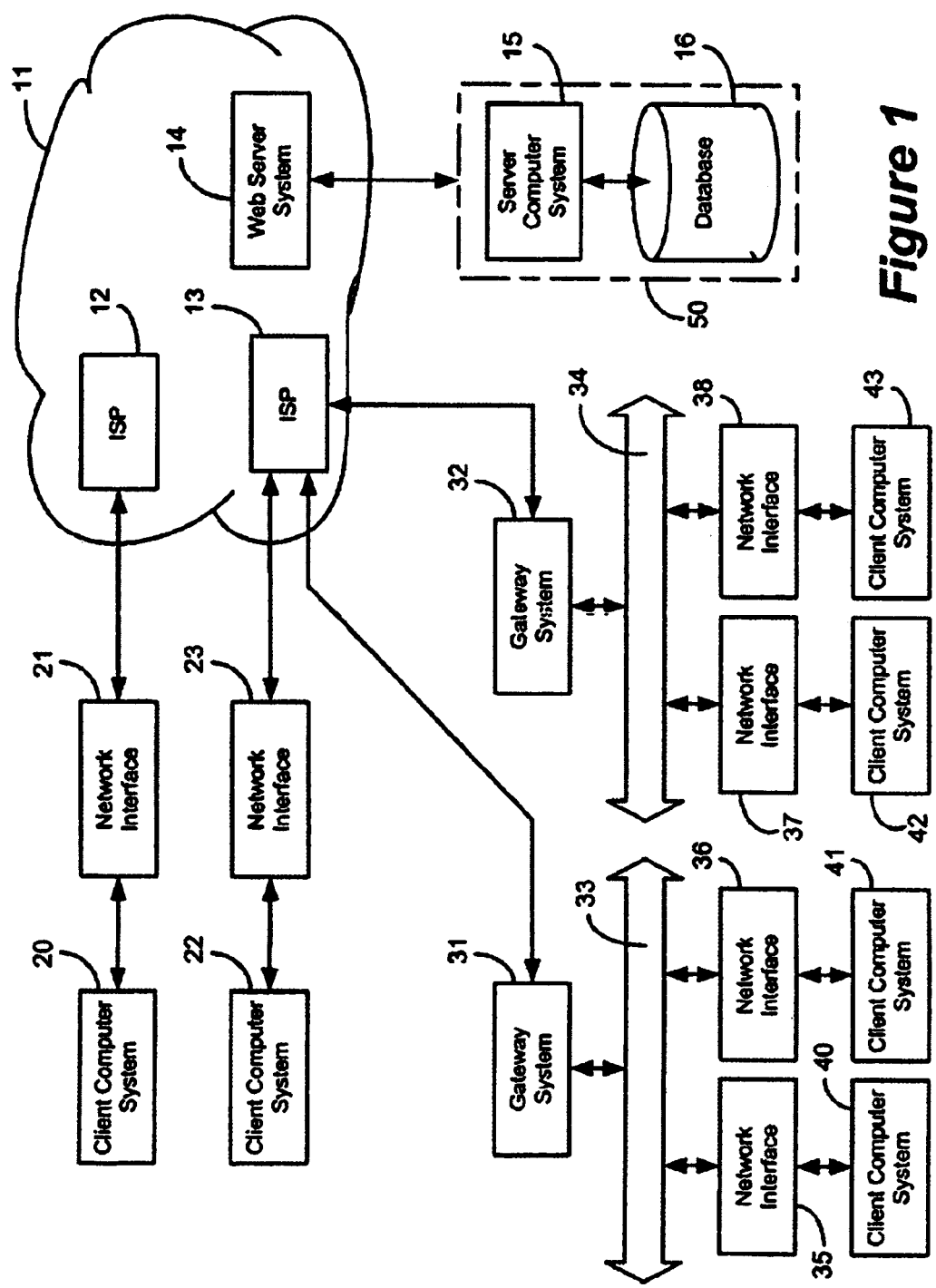
FIG. 1 is a block diagram for one embodiment of an operating environment for practicing the present invention.

Referring now to the drawings, the details of preferred embodiments of the present invention are graphically and schematically illustrated. Like elements in the drawings are represented by like numbers, and any similar elements are represented by like numbers with a different lower case letter suffix. It is to be understood, however, that the present invention may be embodied in various forms. Therefore, specific details disclosed herein are not to be interpreted as limiting, but rather as a basis for the claims and as a representative basis for teaching one skilled in the art to practice the present invention.

FIG. 1 is a block diagram exemplifying one embodiment of the present invention in a suitable operating environment. The following description of FIG. 1 provides an overview of computer hardware and other operating components suitable for implementing the present invention, but it is to be appreciated that the present invention is not limited to the configuration shown in FIG. 1. FIG. 1 shows several computer systems 20, 22, 40–43 coupled together through a network 11, such as a LAN, WAN or a global digital communications network, such as the World Wide Web or the Internet. The term "Internet" as used herein refers to a network of networks, which uses certain protocols, such as the TCP/IP protocol, and possibly other protocol such as the hypertext transfer protocol (HTTP) for a hypertext markup language (HTML) documents that make up the World Wide Web. The physical connectivity scheme of the Internet and the communication protocols and procedures of the Internet are well known in the art.

A client computer system 20, 22, and 40–43 typically obtains access to the Internet 11 through an Internet Service Provider (ISP) 12 & 13. Access to the Internet 11 allows a user of a client computer systems 20, 22, and 40–43 to exchange information, receive and send e-mails and view documents such as documents prepared in the HTML format. These documents are provided by web servers 14, which is considered to be "on" the Internet 11. Often these web servers 14 are provided by ISPs. However, setting up a computer system to be directly connected to the Internet 11, and serve as it own ISP is well-known in the art. A web server 14 is typically at least one computer system, which operates as a server computer system and is configured to operate with the protocols of the World Wide Web, and is coupled with the Internet 11. Optionally, web server 14 can be part of an ISP 12 & 13 which provides access to the Internet 11 for client systems. FIG. 1 shows a web server 14 coupled to a server computer system 15 which itself is coupled to web content 16, which is a form of a media database. It is to be appreciated that while two computer systems 14 and 15 are shown in FIG. 1, web server 14 and server computer system 15 can be one computer system having different software components, one providing web server 14 functionality and another providing server 15 functionality.

With the appropriate web browsing software, a client computer systems 20, 22 and 40–43 can view HTML pages provided by web server 14 via the Internet 11. In one embodiment of the present invention, the web server 14 comprises a message management server. As shown in FIG. 1, an ISP 12 provides Internet connectivity to a client computer system 20 through a modem or network interface 21, which can be considered part of client computer system 20. Client computer system 20 can be a personal computer system, a personal digital assistant, a network computer, a Web TV system, an Internet radio receiver, or other such computer systems.

Similarly, an ISP 13 provides Internet connectivity for other client computer systems 22 & 40–43, although, as shown in FIG. 1, the connections are not the same for all of these computer systems. Client computer system 22 is coupled through a network interface 23, which may be a modem, while two computer systems 40 and 41 are part of one LAN 33 and two other computer systems 42 and 43 are part of another LAN 34.

It is to be appreciated that a network interface can be practiced using any of a number of devices known to the ordinary skilled artisan, such as an analog modem, a ISDN modem, a cable modem, a satellite transmission interface (e.g., "Direct PC"), or another interface for coupling one computer system to other computer systems. Client computer systems 40–43 are coupled to LAN buses 33 and 34 through network interfaces 35–38, which can be Ethernet network or other network interfaces. The LAN buses 33, 34 are also coupled to gateway computer systems 31, 32, which can provide firewall and other Internet related services for the LANs 33, 34.

The gateway computer systems 31, 32, are coupled to the ISP 13 to provide Internet connectivity to the respective client computer systems 40–43. The gateway computer systems 31, 32 may be conventional server computer systems. Also, web server 14 may be a conventional server computer system.

Figure 2:
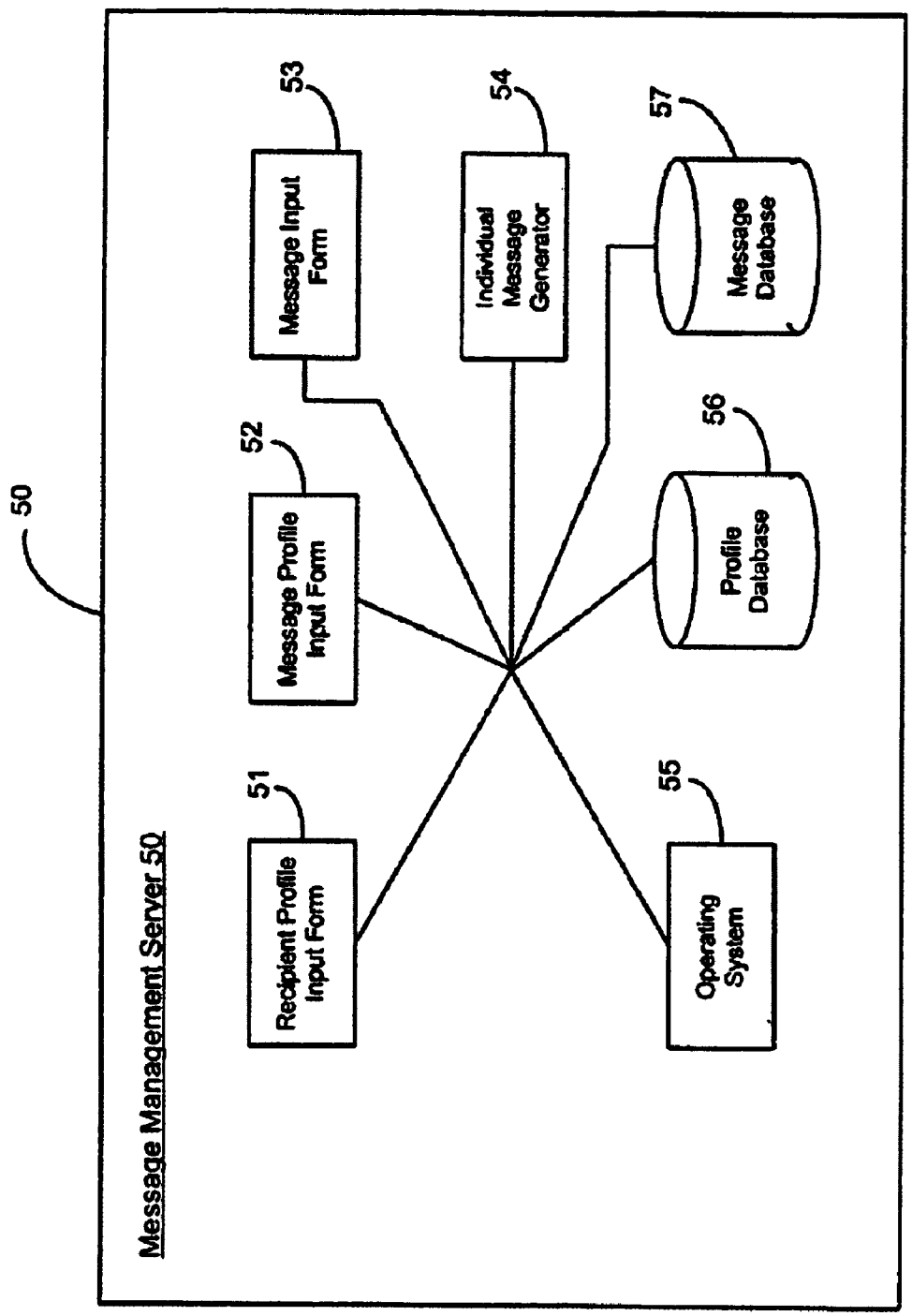
FIG. 2 is a block diagram for one embodiment of a message management server suitable for use in the operating environment of FIG. 1.

FIG. 2 is a block diagram illustrating the components of an embodiment of the message management server 50 the present invention, and their interrelationships. In the embodiment illustrated, the message management server 50 is at least in party comprised of the server computer system 15 and database 16 of FIG. 1. The message management server 50 includes a profile database 56 for centrally storing profile and other information received from messengers and recipients, and from other users, such as system administrators. The message management server 50 includes a message database 57 for centrally storing messages received from messenger client computer systems 40, 41, 42 & 43. A computer system used to enter recipient profile data into the message management server 50 is a recipient computer system 20 & 22.

The message management server 50 comprises a recipient profile software application which includes a recipient profile input form 51. The recipient profile input form 51 include discrete information fields, as will be discussed below, and may be displayed at a recipient's client computer 20 & 22 as a web page, as described above. The recipient profile input form 51 receives information input through the recipient computer systems 20 & 22, and the associated application processes the information into records to be stored in profile database 56.

The message server 50 also comprises a messenger profile software application, which includes a messenger profile input form 52. The messenger profile input form include discrete information fields, as will be discussed below, and may be displayed at a messenger's client computer 40, 41, 42 & 43 in the form of a web page, as described above. The messenger profile input form 52 receives information input through the messenger computer systems 40–43, and the associated application processes the information into records to be stored in profile database 56.

The message server 50 further comprises a message input software application, which includes a message input form 53. The message input form 53 include discrete information fields, as will be discussed below, and may display at a messenger's client computer 40, 41, 42 & 43 in the form of a web page, as described above. The message input form 52 receives information input through the messenger computer systems 40–43, and the associated software application processes the information into records to be stored in the message database 57.

The individual message generator 54 obtains information from the database 57 and generates an individual messages for each recipient, based on the combination of recipient and messenger profile parameters and messages entered into the profile 56 and message 57 databases.

It is also to be appreciated that message management server 50 and its component applications are controlled by the operating system software 55 which includes a file management and disk operating system. Example of operating systems with associated file management software includes the Microsoftt Corporation (Redmond, Wash.) series of Windows® operating systems, including Windows Explorer®. The file management system is typically stored in mass memory and causes a processor to execute the various operations required by the operating system to input and output data and to store data in memory, including storing files on mass memory, as will be described below.

FIG. 3a is a block diagram exemplifying one embodiment of a client computer system 20 & 22, wherein the user is a recipient. Recipients are users that are the targeted receivers of messages generated and sent via the individual message generator 54. A recipient computer system 60 includes a web browser 61 for accessing the web server 14 and message management server 15 via a connection 63 to the Internet 11. The recipient 60 also includes an operating system 62, to run other programs on the recipient computer system 22. The connection arrow 63 of FIG. 3a illustrates the connection of the recipient computer system 60 to an ISP 12 & 13 for interacting with other computer systems via the Internet 11. It is understood that any or all of the modules 61 & 62 of the recipient computer system 60 may be included in hardware or software, on one system or on many systems.

FIG. 3b is a block diagram exemplifying an embodiment of a client computer system 40, 41, 42 & 43, wherein the user is a messenger. The messenger computer system 70 includes a web browser 71 and an operating system 72. The web browser 71 is used to interact via a network, like the Internet 11, with the web server 14 and the message management server 15. The operating system 72 runs programs on the messenger computer system 70. The connection arrow 73 illustrates the direct or indirect connection of the messenger computer system 70 to an ISP 13 for interacting with other computer systems via the Internet 11. It is understood that any or all of the modules 71 and 72 of messenger computer system 70 may be included in hardware or software, on one system or on many systems.

Figure 4:
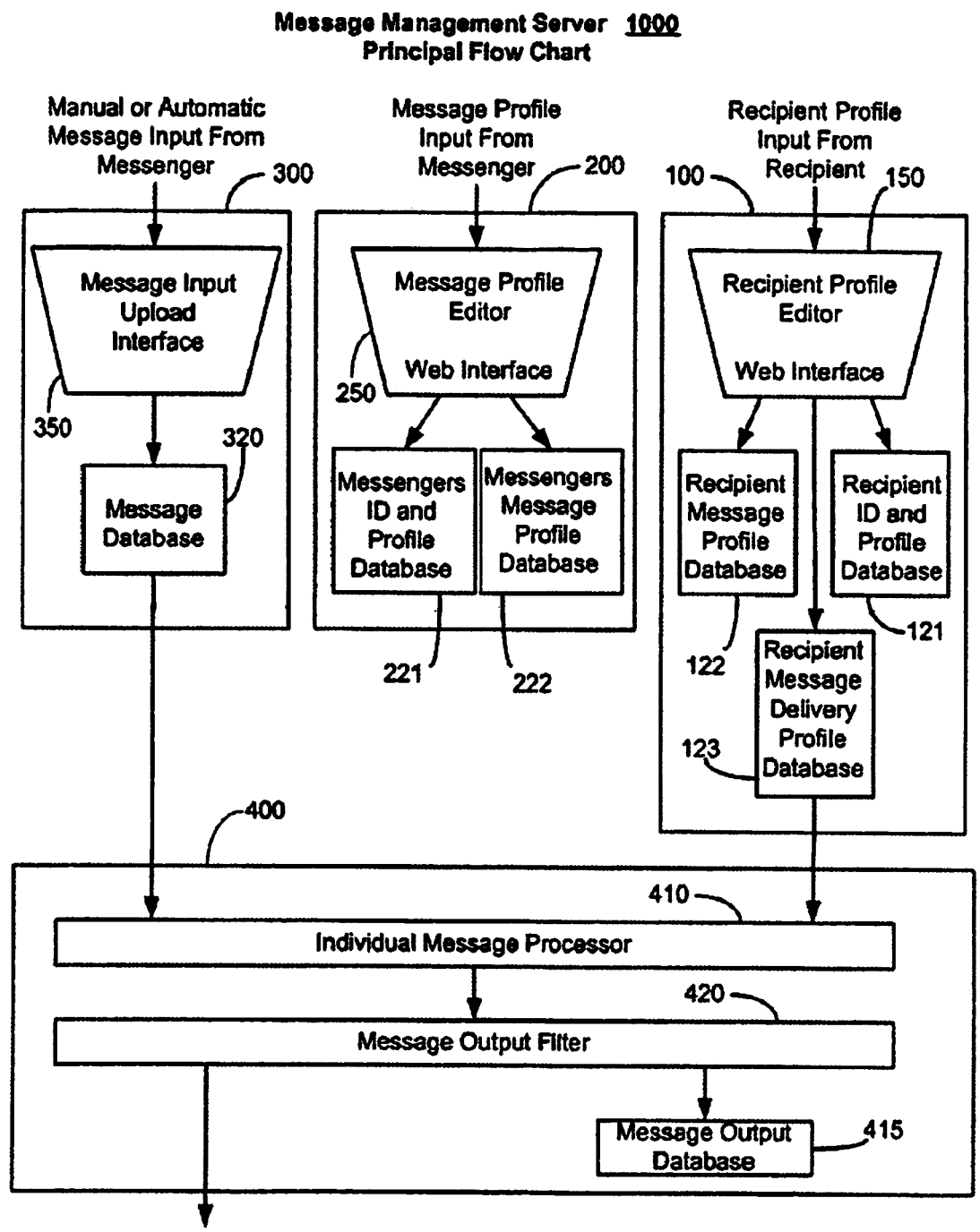
FIG. 4 shows an principal overall flow diagram of a message management server system 1000—a exemplary embodiment of the present invention. The figure is illustrating the relationship between the various levels of the subsystems.

FIG. 4 is a block diagram illustrating the overall principle of an exemplary embodiment of the present message management server 1000. The figure illustrates the relationship between the various subsystems 100, 200, 300 and 400 of the message management server 1000.

The recipient profile system 100 is for entering, managing and storing rules about how the message management system server 1000 is to communicate with each individual recipient. From a recipient computer system 60, as described in FIG. 3a, a recipient will access the message server 1000 through recipient profile editor/web interface 150. The web interface feature of the profile editor/web interface 150 could be a Web site (HTML document) accessed by the recipient via a web browser or similar application.

A recipient will log on to the message management system server 1000 and enter his/her basic identification data. The identification data will be stored in the recipient ID and profile database 121, a sub system of the profile database 56 of FIG. 2. In addition, the recipient will enter one or more sets of message profile data, specifying one or more messengers, type of messages and type of content the recipient wishes to receive from each messenger. These data will be stored in the recipient message profile database 122, a sub system of the profile database 56 in FIG. 2. For each message profile entered, the recipient will specify one or more message delivery profiles with data about how messages must be distributed, where to receive the specified message and the type of message devices to transmit the messages. These data are stored in the message delivery profile database 123, a subsystem of the profile database 56 in FIG. 2.

The messengers profile system 200 allows a messenger to access the message management system server 1000 to enter and maintain his/her own basic identification information and messenger profile data from a messenger computer system 70, as described in FIG. 3b. The messenger computer 70 accesses the message management server 1000 via the messenger profile editor/web interface 250, using an Internet enabled application, such as a web browser. The messenger will log on to the message system server 1000 and enter his identification data. These data are stored in the messengers ID and profile database 221, a subsystem of the profile database 56 of FIG. 2.

Additionally, a messenger utilizes the messenger profile editor/web interface 250 to enter one or more sets of messenger profile data, specifying the types of messages and types of content the messenger is providing to recipients in general. This profile is stored the messengers message profile database 222, a subsystem of the profile database 56 of FIG. 2. Also, a messenger can specify a list of specific recipient ID's, each combined with a set of message types and content types that the identified must receive. The messengers message profiles entered by the messenger is stored in the recipient message profile database 122, a subsystem of the profile database 56 of FIG. 2.

The message input system 300 is used by messengers with a valid messenger profile to enter messages for the purpose of having them distributed to recipients according to their individual specified recipient message profiles. From a messenger computer system 70, a messenger logs onto the message management system server 1000. The messenger computer 70 accesses the message management server 1000 via the message input (upload) editor/web interface 350, using an Internet enabled application, such as a web browser. Once connected, the messenger can manually or automatically enter the message data or upload messages files for distribution to recipients with an appropriate message profile. The message data will be stored in the message database 320, a subsystem of the message database 57 of FIG. 2.

The message processor 410 of the individual message generator 400 combines the data from the recipient message delivery profile database 123 with appropriate data from the message database 320. From this combination of data, the message output filer 420 will generate individual messages for each Recipient as specified in the message database 57 and recipient message delivery profile database 123. The generated messages are stored in the message output database 415 until they are further distributed. At the appropriate time, the message generator 400 will forward the generated messages to a message distribution server (not a part of this invention) from where the messages will be converted to the right device protocols and distributed to the devices and addresses as specified by the intended recipient.

Figure 5:
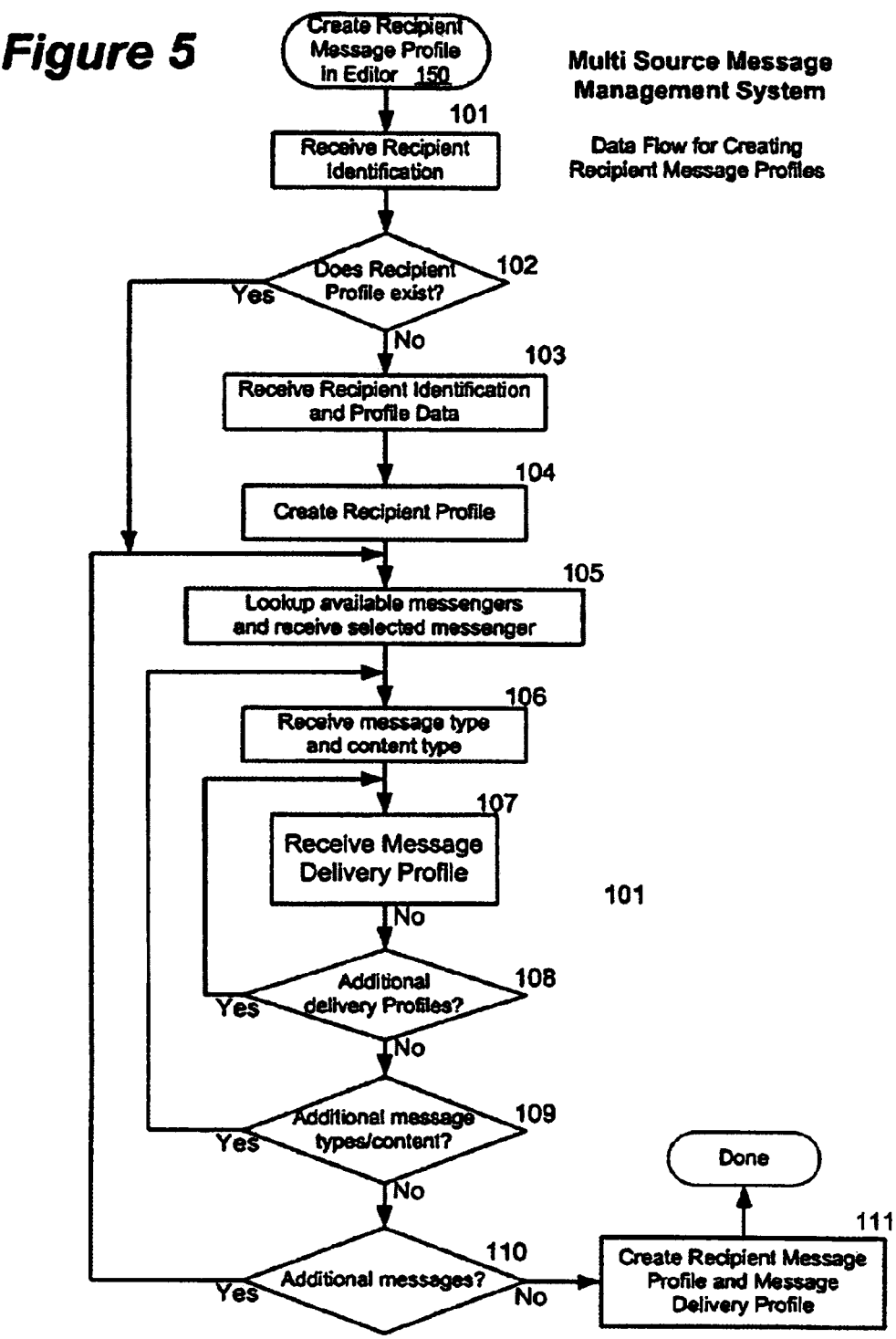
FIG. 5 shows the process related to Recipient Profile system 100 in FIG. 4 for creating and maintaining a recipient message profile and message delivery profiles for one or more messengers.

FIG. 5 is block flow diagram of an exemplary process related to using the recipient profile system 100 of FIG. 4 to create and maintain recipient message profiles for a multiple set of messengers. To create or maintain (e.g., update or modify) a recipient message profile, the recipient will logon to the message management system server 1000 using the logon step or procedure 101 to access the recipient profile editor 150. The recipient editor 150 will perform a check 102 to establish whether the recipient has a profile. If not, the recipient is prompted 103 to provide basic identity and profile information. Then the recipient editor 150 creates 104 a recipient identity profile and store this in the recipient ID and profile database 121.

Based on the existence of recipient identity profile data, procedure 105 will now perform a lookup in the messenger ID and message profile database 221, and retrieve all messengers with a basic profile matching the recipient's basic profile parameters: e.g., country, city, gender, etc. A list of available messengers is presented to the recipient, and tile recipient selects a messenger. In step 106, the recipient specifies the message types and content types to be received from the selected messenger. In step 107, the recipient specifies one or more preferred delivery profiles: e.g., the message device, the delivery address, the delivery schedule, sequence of appearance, etc. for each message and content type specified in step 106.

In step 108, the recipient editor application 150 checks for additional delivery profiles. Step 107 is repeated until the recipient has specified all necessary delivery profiles and parameters for the chosen message and content type. In step 109, the recipient editor 150 checks for additional message and content types. Step 106 is repeated until the recipient has specified all necessary message and content types for the chosen messenger. In step 110, the recipient editor application 150 checks for additional messengers. Step 105 is repeated until the recipient has specified all the messengers for whom he/she wants to specify a message profile. In step 111, the recipient editor application creates a recipient message profile for the recipient logged onto the system and stores the profile data in the recipient message profile database 122. Step 111 also creates a recipient message delivery profile for the recipient logged onto the system and stores this data in the recipient message delivery profile database 123.

Figure 6:
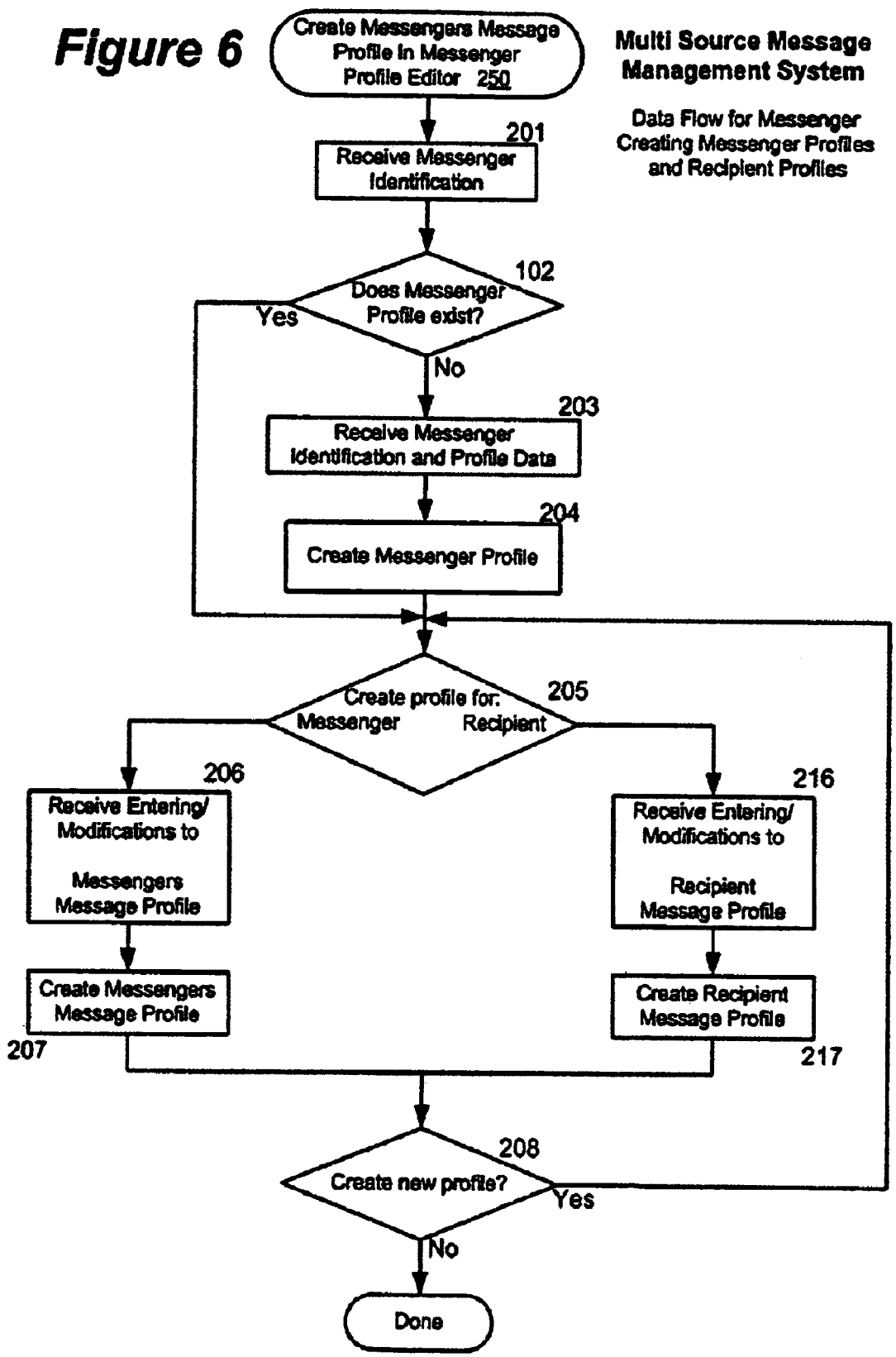
FIG. 6 shows the process related to messenger profile system 200 in FIG. 4 for creating a messengers message profile for the available message types and content type the messenger will offer and recipient message profiles for recipients who must receive specific message types and content types.

FIG. 6 is block flow diagram of an exemplary process related to using the messenger profile input system 200 of FIG. 4 to create and maintain messengers message profiles for the available message types and content type the messenger wishes to offer, and to create and maintain a messenger's recipient message profile for recipients targeted to receive specific message types and content types. To create or maintain a messengers message profiles and/or a messenger's recipient message profiles, the messenger logs onto the message management system server 100 using the logon step or procedure 201 to access the messenger profile editor 250. The messenger profile editor 250 will perform a check 202 to establish whether the messenger has a profile. If not, the messenger is prompted 203 to provide basic identity and profile information. Then the messenger editor 250 creates 204 a messenger identity profile and stores this in the messenger ID and profile database 221.

The messenger editor 250 now asks 205 if the messenger will create or update a messenger message profile or a messenger's recipient message profile. If in step 205, the messenger elects to create or update a messengers message profile, the messenger editor 250 displays 206 an input screen from which the messenger can specify multiple sets of message types and content types to be offered to recipients. In step 207, the messenger editor 250 then creates a messengers message profile for the messenger logged on and store this in the messengers message profile database.

Alternatively, if in step 205, the messenger elects to create or update a messengers recipient message profile, the messengers editor 250 displays 216 an input screen from which the messenger can specify a list of recipient IDs together with multiple sets of message types and content types that each specified recipient is to receive. Then in step 217, the messengers editor 250 creates a recipient message profile for the specified recipient and messenger logged on to the server 1000 and store this in the recipient message profile database 122.

Then in step 208, the messengers editor 250 requests if additional profiles are to be created, and if the messenger elects "yes," step 205 is repeated. If the messenger elects "no," then the procedure is done.

Figure 7:
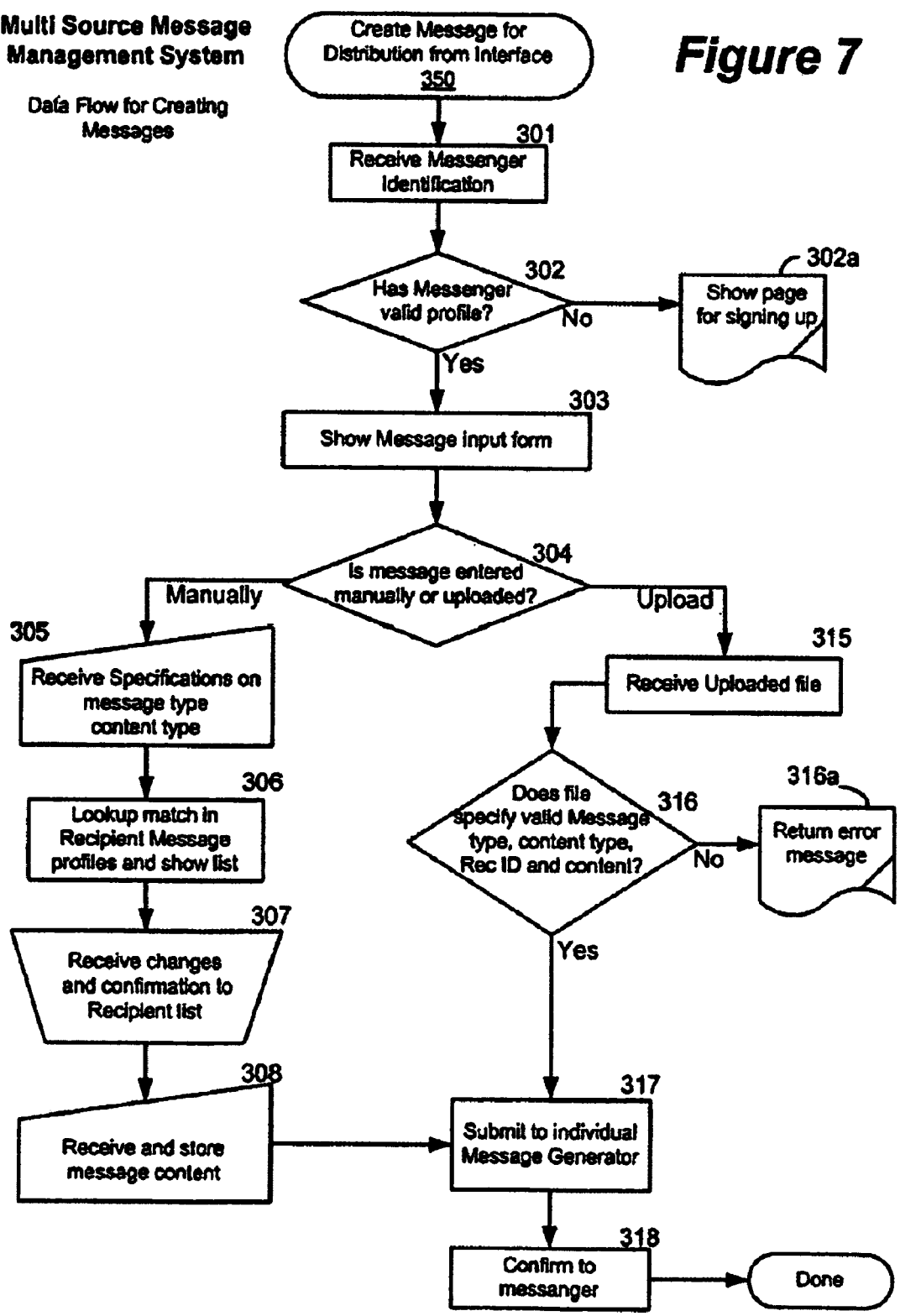
FIG. 7 shows the process related to message input system 300 in FIG. 4 for how the messenger can enter messages or upload message files manually or automated, to be distributed to the recipients.

FIG. 7 is block flow diagram of an exemplary process related to using the message input system 300 of FIG. 4 to manually or automatically input and/or upload messages from a messenger into the present message management system server 1000. To input or upload a message for distribution, the messenger logs onto the message management server 1000 using the logon step 301 to access the message input editor. The message input editor application 350 performs a check 302 to establish if messenger has a valid profile and account for distributing messages. If not, the messenger is shown information 302a for how to open an account, directed elsewhere or exited from the server 1000. If the messenger has a valid profile and account, the message input editor 350 displays 303 a message input form 53, and allows the messenger to elect 304 to enter a message manually or by up loading a message file.

If uploading 315 a message file is elected, the messenger attaches the file to the input form 53, and submits the file to the message management system server 1000. The message input editor 350 validates 316 that the submitted file is correctly formatted, and has valid message type, content type, recipient IDs, message content etc., according to messengers message profile stored in the messengers message profile database 222. If message file is not valid, an error message is returned 316a to the messenger logged on. If message file is valid, the message input editor 350 submits 316 the message to the individual message generator 400 and to the message database 320.

If manually entering 305 the message information is elected, the input form 53 prompts the messenger to enter specifications of message type and content type. The message input editor 350 then looks for match 306 between the messenger, message type, content type and the recipient message profiles in the recipient message profile database 122, and a list of matching recipient IDs is presented to the messenger. The message input editor 350 receives 307 any amendments (additions, deletions, modification) to the recipient ID list, and finally confirm the Recipient ID's list. In step 308, the message input editor 350 allows the messenger to enter the actual message content through an Internet enabled message component of the message input form 53. After a message has been entered and confirmed, the message input editor 350 submits 317 the message and the confirmed recipient ID list to the individual message generator 400 and to message database 320.

Then the input editor 350 confirms 318 for messenger logged on that the message has been submitted for message generation.

Figure 8:
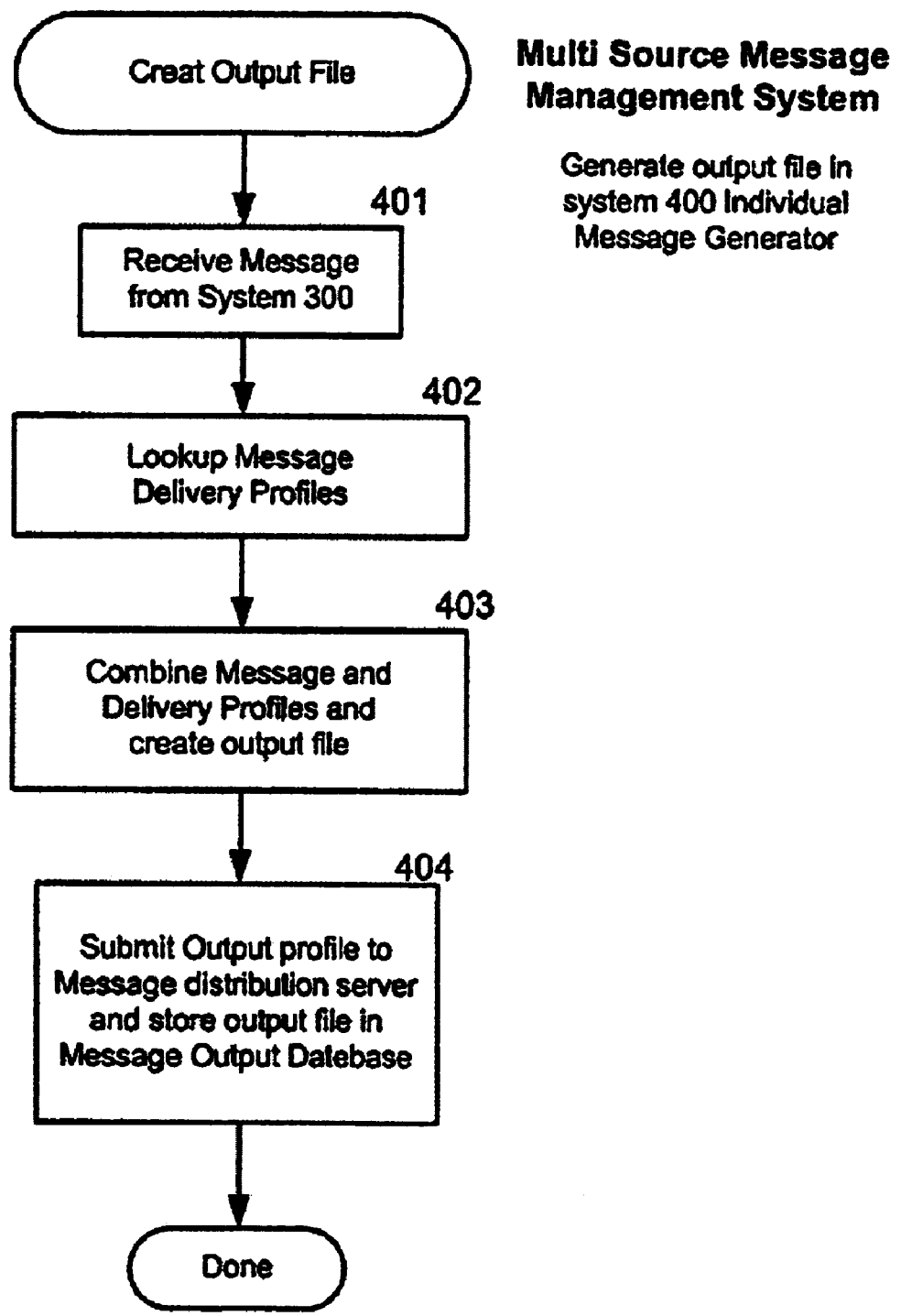
FIG. 8 shows the process related to individual message generator system 400 in FIG. 4 for how the message uploaded or entered is combined with the message delivery profiles and how a output file with individual messages is generated and submitted for distribution.

FIG. 8 is a block flow diagram of an exemplary process for utilizing the individual message generator 400 of the message management system server 1000. According to the process, the individual message processor 410 receives 401 a message notification from message input system 300. On receipt of the notification, the processor 410 looks up 402 the message in the message database 320, and also looks up the recipient message profiles and delivery profiles in the recipient message profile database 122 and the recipient message delivery profile database 123. Further in this step, the individual message processor 410 matches the recipient, and type and content criteria for the message. In the next step 403, the message output filer 420 of the individual message generator 400 combines the message with the delivery profile data for all recipients matching the profile, and creates a total output file. The message output filer 420 then submits 404 the message output file to a message distributions server (not a part of this invention) and to the message output database 415 for storage.

While the above description contains many specifics, these should not be construed as limitations on the scope of the invention, but rather as exemplifications of one or another preferred embodiment thereof. Many other variations are possible, which would be obvious to one skilled in the art. Accordingly, the scope of the invention should be determined by the scope of the appended claims and their equivalents, and not just by the embodiments.

What is claimed is:

1. An electronic message management system comprising:
    an electronic computer system in operative communication with a global digital communications network, and an electronic message management database in operative communication with the computer system; the electronic computer system having
        a recipient profile application for receiving recipient profile data from recipients via the global network and storing the recipient data in the database, the profile data including delivery parameters specified by a recipient of where, when and how specific types of messages from specific messengers are delivered to the recipient,
        a messenger profile application for receiving messenger profile data from messengers via the global network and storing the messenger data in the database, including messenger identifying data,
        a message input application for receiving message files from a messenger via the global network and storing the message files in the database, and
        an individual message generator in communication with the database and operative to access and utilize data and files from the database to generate an individual message to be sent to the recipient specified by the messenger via the global communications network according to the delivery parameters, and a message management server operating system; and
    the message management database including recipient and messenger profile databases for storing recipient and messenger profile data respectively, and a message database for storing message data files.

2. The electronic message management system of claim 1, wherein the recipient profile application includes a global network interactive recipient profile input form, the recipient profile input form being accessible to a recipient computer via the global digital communications network.

3. The electronic message management system of claim 1, wherein the messenger profile application includes a global network interactive messenger profile input form, the messenger profile input form being accessible to a messenger computer via the global digital communications network.

4. The electronic message management system of claim 1, wherein the message input application includes an interactive global network message input form, the message input form being accessible to a messenger computer via the global communications network.

5. The electronic message management system of claim 1, wherein the recipient profile application further comprises a network interface and a recipient profile editor for receiving recipient profile data from a recipient computer via the global network interface and for manipulating the recipient profile database to store the recipient profile data.

6. The electronic message management system of claim 1, wherein the messenger profile application further comprises a global network interface and a messenger profile editor for receiving messenger profile data from a messenger computer via the global network interface and for manipulating the messenger profile database to store the messenger profile data.

7. The electronic message management system of claim 1, wherein the message input application further comprises a global network interface and a message data file editor for receiving a message file data from a messenger computer via the global network interface and for manipulating the message database to store the message data file.

8. A method of inputting data into the message management system of claim 1 from client computers via a global communications network, to centrally manage the distribution and delivery format of electronic messages from multiple messenger sources to multiple individual recipients, comprising the steps of:
    providing the client computers with access to the message management system via a global communications network, where the client computers are messenger and recipient computers;
    receiving a connectivity request from a client computer for access to the message management system to input data;
    connecting the client computer to the message management system via the global communication network;
    prompting the client computer for the data to be input by providing a data input form to the client computer; and
    accepting input data from the client computer and entering the input data into an electronic message management database of the message management system.

9. The method of claim 8, wherein the prompting step includes providing an input form to the client computer.

10. The method of claim 8, wherein the prompting step includes providing an input form to the client computer, the input form being at least one input form selected from the group consisting of a recipient profile form, a messenger profile form, and a message input form.

11. The method of claim 8, wherein the accepting step includes entering the input data into an electronic message management database comprising a recipient profile database, a messenger profile database, and a message database.

12. The electronic message management system of claim 1, wherein the messenger profile application receives and stores messenger profile data, including recipient identifications and recipient profiles, which messages to deliver to the recipients and profiles stored.

13. The messenger profile application of claim 12, further comprising recipient identification and recipient profiles for recipients who are prevented from receiving a message from the messenger.

14. The electronic message management system of claim 1, wherein the individual message generator communicates with the database to identify messages and messenger parameters that are compatible with a recipient profile, and to configure the messages for delivery to the recipient.

15. The electronic message management system of claim 1, wherein the individual message generator generates and sends the individual message via a means selected from the group consisting of; electronic mail, voice telephone, facsimile transmission, and digital transmission.

16. The electronic message management system of claim 1, wherein the individual message generator generates the individual message and sends the individual message via a means selected from the group consisting of an electronic means and a hardcopy means.

17. The electronic message generator system of claim 16, wherein the individual message generator generates the individual message and sends the individual message via an electronic means selected from the group consisting of electronic mail, voice telephone, facsimile transmission, digital transmission, computer network, voice mail, SMS, telex, and wireless transmission.

18. The electronic message generator system of claim 16, wherein the individual message generator generates the individual message and sends the individual message via a hardcopy means selected from the group consisting of paper media. magnetic media, and optical media.

* * * * *